United States Patent [19]

Tooley et al.

[11] Patent Number: 5,562,990
[45] Date of Patent: Oct. 8, 1996

[54] ORGANOSILICON TREATMENT OF $TIO_2$ PIGMENT BEARING A COATING WITH FLUORIDE IONS

[75] Inventors: Patricia A. Tooley, Wilmington, Del.; Philipp M. Niedenzu; Austin H. Reid, Jr., both of New Johnsonville, Tenn.

[73] Assignee: E. I. Du Pont de Nemours and Company, Wilmington, Del.

[21] Appl. No.: 392,708

[22] Filed: Feb. 23, 1995

Related U.S. Application Data

[63] Continuation-in-part of Ser. No. 203,059, Feb. 28, 1994, abandoned.

[51] Int. Cl.⁶ ................................. B32B 5/16; C09C 1/36
[52] U.S. Cl. .............. 428/403; 106/287.12; 106/287.14; 106/287.16; 106/287.17; 106/287.19; 106/436; 106/442; 106/443; 106/445; 106/446; 106/447; 428/404; 428/405; 428/407; 428/447; 428/523; 428/543; 428/696; 428/701; 428/702
[58] Field of Search .................................. 428/403, 404, 428/405, 407, 328, 329, 447, 696, 699, 701, 702, 543, 523; 106/287.12, 287.13, 287.14, 287.16, 287.17, 287.23, 287.27, 287.19, 436, 442, 443, 445, 446, 447

[56] References Cited

U.S. PATENT DOCUMENTS

| | | | |
|---|---|---|---|
| 3,926,660 | 12/1975 | Holle et al. | 106/300 |
| 4,061,503 | 12/1977 | Berger et al. | 106/300 |
| 4,247,708 | 1/1981 | Tsutsumi et al. | 556/456 |
| 4,460,655 | 7/1984 | Jacobson | 428/530 |
| 4,715,986 | 12/1987 | Grüning et al. | 252/315.2 |
| 5,057,151 | 10/1991 | Schuster et al. | 106/2 |

FOREIGN PATENT DOCUMENTS

| | | |
|---|---|---|
| 88180/91 | 6/1992 | Australia. |
| 5-139748 | 6/1993 | Japan. |

Primary Examiner—Hoa T. Le

[57] ABSTRACT

Organosilicon treatment of $TiO_2$ particles coated with alumina or alumina-silica having a fluoride compound or fluoride ions associated with them is disclosed to improve properties such as photostability and humidity resistance when incorporated in powder coatings and/or plastics.

13 Claims, No Drawings

ORGANOSILICON TREATMENT OF $TiO_2$ PIGMENT BEARING A COATING WITH FLUORIDE IONS

CROSS-REFERENCE TO EARLIER FILED APPLICATION

This is a continuation-in-part of patent application Ser. No. 08/203,059 filed Feb. 28, 1994, now abandoned.

BACKGROUND OF THE INVENTION

1. Field of the Invention

This invention relates to organosilicon treatment of $TiO_2$ particles coated with alumina or alumina-silica having a fluoride compound or fluoride ions associated with them. More particularly, it relates to the improvement in properties such as photostability and humidity resistance of the coated $TiO_2$ particles by the addition of an organosilicon compound.

2. Description of the Related Art

"Aging" is an effect of environment and occurs as $TiO_2$ pigment is exposed to high humidity and high temperature. As a result, the $TiO_2$ tends to agglomerate and there is a loss of optical properties of the $TiO_2$ pigment when incorporated into powder coatings and plastics applications.

Japanese Patent Application No. SHO 57-163604 discloses a toner composition containing $TiO_2$ treated with hexyltrimethoxysilane or octyltrimethoxysilane in a toner matrix containing colorant and a fixing component. Therein, the toner exhibits enhanced developing properties, storage properties and longer service life by improving the fluidity of the toner. No mention is made of $TiO_2$ particles coated with fluoride densifted alumina. Further, no mention is made on improving photostability or improving optical properties.

U.S. Pat. No. 4,460,655 discloses a pigment of $TiO_2$ particles coated with alumina or alumina-silica and having a fluoride compound or fluoride ions associated with them. The pigment of the invention is highly resistant to discoloration on exposure to ultraviolet light, and, when used in making a paper laminate, gives a product with significantly better lightfastness than one using conventional $TiO_2$ pigment. Nonetheless, properties such as improved photostability and humidity resistance of the $TiO_2$ pigment therein can be further enhanced.

Each of the prior art compositions and processes suffers from various deficiencies, and further improvements are desirable.

SUMMARY OF THE INVENTION

The performance properties of white pigments comprising $TiO_2$ particles coated with alumina or alumina-silica having a fluoride compound or fluoride ions associated with them are enhanced when the coated $TiO_2$ is treated with an organosilicon compound. The resulting compositions are particularly useful in powder coatings and/or plastics applications.

DETAILED DESCRIPTION

The present invention relates to an improvement to the coated $TiO_2$ pigment described in U.S. Pat. No. 4,460,655, the teachings of which are incorporated herein by reference. The pigment of the invention is composed of rutile $TiO_2$ particles conventionally coated with alumina or with alumina-silica. The alumina or alumina-silica ordinarily constitutes about 1 to about 8%, preferably about 3 to about 5%, by weight, of the pigment. Associated with the particles is a fluoride compound at a concentration of about 0.05 to about 5%, by weight of the $TiO_2$, or fluoride ions at a concentration of about 0.05 to about 2%, by weight of the $TiO_2$, preferably about 0.2 to about 0.6%. "Associated with the particles" means that some of the fluoride compounds or fluoride ions are adsorbed on the $TiO_2$ particle surfaces, and that some are contained within the alumina or alumina-silica themselves.

Fluoride ion content and fluoride compound content of the pigment may be determined as follows:

(a) Slurry 200 g of the pigment to be analyzed in 200 ml of distilled and doubly deionized water;

(b) Adjust the pH of the slurry to 10.0 with 50% aqueous sodium hydroxide;

(c) Stir the slurry for 24 hours in a closed vessel; and (d) Filter and analyze the tiltrate by ion chromatography for the amount present, expressed as percent of the pigment weight.

The pigment of the invention which has fluoride ions associated with it is also cerium ion-free, which means that the pigment is either completely devoid of cerium ions or contains only a small and insignificant number.

Fluoride compounds which can be associated with the pigment particles according to the invention are $K_7Ce_6F_{31}$
$Na_7Ce_6F_{31}$
$Li_7Ce_6F_{31}$ and

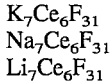

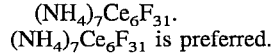 is preferred.

The $TiO_2$ used to prepare the pigment of the invention can be of the conventional rutile variety, prepared by either the chloride or the sulfate process, as described in greater detail in "The Pigment Handbook", Vol. 1, 2nd ed., John Wiley & Sons, N.Y. (1988), the teachings of which are incorporated herein by reference.

A pigment of the invention which has fluoride ions associated with its particles may be made by first preparing an aqueous slurry containing 200–400 g per liter of $TiO_2$. This slurry is brought to 45°–70° C. and is held there during the rest of the preparation procedure. To the slurry is then added, with stirring, enough of a water-soluble fluoride to give a fluoride ion concentration in the slurry of about 0.5–2%, by weight of the $TiO_2$. Illustrative of fluorides which can be used to supply fluoride ion are NaF, KF, $NH_4F$ and LiF. The slurry is then ordinarily stirred for 1–15 minutes.

In an alternative embodiment, phosphoric acid may be substituted for NaF, KF, $NH_4F$ and LiF. The slurry is processed as described above. The pigment made by this process has phosphate ions associated with the $TiO_2$ particles and/or the alumina or alumina-silica. The phosphate ions are present at a concentration of about 0.05 to about 2% by weight of the $TiO_2$ preferably about 0.2 to about 0.6%.

Alumina is then precipitated on the $TiO_2$ particles by adding enough sodium aluminate to the slurry to give a concentration of about 1–8%, by weight of the $TiO_2$. Acid, ordinarily sulfuric acid or hydrochloric acid, is added at the same time, to maintain the pH of the slurry within the range of 6.5–9 during the precipitation step. After addition of the aluminate is complete, the slurry is allowed to cure, with stirring, for 15–30 minutes.

The resulting pigment is then separated from the liquid by filtration or centrifugation and washed with water. However, the pigment of this aspect of invention is prepared, one should take care to avoid the addition of cerium ions at every stage of preparation.

The pigment of the invention which has a fluoride compound associated with its particles may be prepared in a similar way, by first preparing an aqueous slurry of $TiO_2$ and then generating the fluoride compound in it in situ. This is done according to the illustrative equation:

$$31NaF + 6Ce(SO_4)_2 \rightarrow Na_7Ce_6F_{31} + 12Na_2SO_4.$$

Illustrative of cerium salts which may be used are ammonium ceric nitrate, ceric nitrate, and ceric sulfate. Ceric sulfate is preferred.

The amounts of an appropriate cerium salt and a fluoride, required to give the desired concentration of fluoride compound in the pigment, are added to the slurry in ratios dictated by the stoichiometry of the equation. The slurry is then processed as previously described.

A suitable organosilicon compound as described below is then added to the coated $TiO_2$ particles.

Suitable silanes have the formula:

$$R_xSi(R')_{4-x}$$

wherein

R is a nonhydrolyzable aliphatic, cycloaliphatic or aromatic group having at least 1 to about 20 carbon atoms;

R' is a hydrolyzable group such as an alkoxy, halogen, acetoxy or hydroxy or mixtures thereof; and x=1 to 3.

For example, silanes useful in carrying out the invention include hexyltrimethoxysilane, octyltriethoxysilane, nonyltriethoxysilane, decyltriethoxysilane, dodecyltriethoxysilane, tridecyltriethoxysilane, tetradecyltriethoxysilane, pentadecyltriethoxysilane, hexadecyltriethoxysilane, heptadecyltriethoxysilane and octadecyltriethoxysilane. Additional examples of silanes include, R=8–18 carbon atoms; R'=chloro, methoxy, hydroxy or mixtures thereof; and x=1 to 3. Preferred silanes are R=8–18 carbon atoms; R'=ethoxy; and x=1 to 3. Mixtures of silanes are contemplated equivalents. Weight content of the silane, based on total silanized pigmentary $TiO_2$ is typically about 0.3 to about 2.0 wt. %, preferably about 0.7 to about 1.0 wt. %. In excess of 2.0 wt. % may be used but no particular advantage is observed.

In an alternative embodiment, a mixture of at least one silane with at least one polysiloxane is useful in carrying out the invention. Suitable polysiloxanes have the formula:

$$(R_nSiO_{\frac{4-n}{2}})_m$$

wherein

R is organic or inorganic groups;

n=0–3; and m≧2.

For example, polydimethylsiloxane (PDMS), vinyl phenylmethyl terminated dimethyl siloxanes, divinylmethyl terminated polydimethyl siloxane and the like are suitable polysiloxanes. PDMS is a preferred polysiloxane. The silane useful in the mixture may be the silane described above with R=1–8 carbon atoms, R'=alkoxy and x=1 preferred. Weight content of the silane and polysiloxane, based on total silanized pigmentary $TiO_2$, is about 0.3 to about 5.0 wt. %, preferably from about 1.0 to 2.5 wt. %. Especially preferred is about 0.5 to 1.0 wt. % silane with R=4 or 8 carbon atoms, R'=alkoxy, and x=1; and 1 wt. % PDMS. The ratio of silane to polysiloxane can be 1 silane:2 polysiloxane up to 2 silane:1 polysiloxane. An especially preferred ratio is 1 silane:1 polysiloxane.

"Silanized" $TiO_2$ is defined herein to refer to $TiO_2$ treated with at least one silane, or the mixture of at least one silane and at least one polysiloxane (collectively referred to herein as organosilicon treated).

"Coated" $TiO_2$ is defined herein to refer to $TiO_2$ particles with alumina or alumina-silica having a fluoride compound or fluoride ions (or phosphate ions) associated with them.

The silane and polysiloxane are commercially available or can be prepared by processes known in the art such as those described in "Organosilicon Compounds", S. Pawlenko, et al., New York (1980), the teachings of which are incorporated herein by reference. The method of addition is not especially critical and the coated $TiO_2$ pigment may be treated with the silane in a number of ways. For example, the silane addition can be made neat or prehydrolyzed, from a slurry, a filtration step, during drying or at a size operation such as a fluid energy mill, e.g., micronizer, or media mill as described in greater detail in copending application entitled "PROCESS FOR PREPARING SILANIZED $TiO_2$ PIGMENTS USING A MEDIA MILL", the teachings of which are incorporated herein by reference, or post blending after micronizing. For example, U.S. Pat. No. 3,834,924 describes organosilane and pigment dispersion mixed or blended directly in a suitable solids mixing apparatus. An example of post blending is described in greater detail in U.S. Pat. Nos. 3,915,735 and 4,141,751. The polysiloxane addition can be made in conjunction with the silane or post addition to the silanized pigment. The organosilicon addition is described in greater detail below. If water, either a liquid or vapor (steam), is present as a component of the process stream, hydrolysis of the hydrolyzable groups of the silane will occur and the silane coating will bond to a $TiO_2$ base and/or the coated $TiO_2$. Prehydrolyzing the silane is a preferred step in treating the $TiO_2$ pigment with the silane. If the silane is added neat to the coated $TiO_2$, then moisture adsorbed on the $TiO_2$ will effect the hydrolysis, but at a lower rate than if excess moisture is present. Hydrolysis of silanes is described in greater detail in "Organofunctional Silanes" by Union Carbide (1991), the teachings of which are incorporated herein by reference.

The resulting pigments may be further spray dried and ground in a fluid-energy mill such as a micronizer if the organosilicon addition occurred at the slurry or filtration step.

The resulting materials of the invention may be used to pigment plastics in any of the customary ways, typically by melt compounding techniques known in the art. Similarly, powder coating compositions may be prepared with the pigments of the invention in any of the conventional ways. These procedures are set forth in greater detail in "International Plastics Handbook", 2nd Ed., H. Saechtling, N.Y. (1987), which is incorporated into this specification to show such procedures.

Polymers which are suitable for use in the present invention include, by way of example but not limited thereto, polymers of ethylenically unsaturated monomers including olefins such as polyethylene, polypropylene, polybutylene, and copolymers of ethylene with higher olefins such as alpha olefins containing 4 to 10 carbon atoms or vinyl acetate, etc.; vinyls such as polyvinyl chloride, polyvinyl esters such as polyvinyl acetate, polystyrene, acrylic homopolymers and copolymers; phenolics; alkyds; amino resins; epoxy resins, polyamides, polyurethanes; phenoxy resins, polysulfones; polycarbonates; polyether and chlorinated polyesters; polyethers; acetal resins; polyimides; and polyoxyethylenes. The polymers according to the present invention also include various rubbers and/or elastomers either natural or synthetic polymers based on copolymerization, grafting, or physical blending of various diene monomers with the above-mentioned polymers, all as generally known in the art. Thus generally, the present invention is useful for any such white-pigmented plastic or elastomeric compositions (collectively referred to herein as a white-pigmented polymers). For example, but not by way of limitation, the invention is felt to be particularly useful for polyolefins such as polyethylene, polypropylene, polyvinyl chloride, polyamides and polyester.

A wide variety of conventional additives may be included in the plastics and powder coatings as is necessary, desirable or conventional for the intended end use. Such additives include, but are not limited to, antioxidants, light stabilizers, lubricants, thermal processing additives and the like.

Addition of an organosilicon compound to the coated $TiO_2$ eliminates the aging problem. The composition of the invention has a unique combination of improved photostability and resistance to humidity thus resulting in improved optical properties. In addition, throughput in manufacturing the treated $TiO_2$ pigment has been increased via improvement in bulk flow properties, and increased yellowing resistance caused by phenolic polymer additives has been observed as demonstrated below.

The following examples are construed as illustrative and not limitative of the remainder of the disclosure.

EXAMPLES

EXAMPLE 1

3000 grams of rutile $TiO_2$ pigment coated with alumina having fluoride ions associated with them, spray drier output, prepared in accordance with U.S. Pat. No. 4,460,655, was sprayed with 30 grams of octyltriethoxysilane (available from OSi, Tarrytown, N.Y., USA). The loading of the silane was 1 wt %. The treated $TiO_2$ was ground in a micronizer.

EXAMPLE 2

Same as Example 1 except the amount of silane was changed to effect a 0.7 wt % loading of silane on the pigment.

EXAMPLE 3

Same as Example 1 except the amount of silane was changed to effect a 0.3 wt % loading of silane on the pigment.

COMPARATIVE EXAMPLE 4 (C-4)

Same as Example 1 except there was no organosilicon treatment.

EXAMPLE 5

Same as Example 1 except phosphoric acid was substituted for the fluoride ions.

COMPARATIVE EXAMPLES 5 (C-5)

Same as Example 5 except there was no organosilicon treatment.

COMPARATIVE EXAMPLES 6(C-6)

Same as Example 2 except the silane was changed to polydimethylsiloxane effecting a 0.7 wt % loading of silane on the pigment.

EXAMPLE 7

Same as Example 2 except the silane was changed to a mixture of octyltriethoxysilane and polydimethylsiloxane, each in an amount to effect a loading of 0.7 wt % on the pigment or a total of 1.4 wt % loading of silane on the pigment.

EXAMPLE 8

Same as Example 2 except the silane was changed to hexyltrimethoxysilane effecting a 0.7 wt % loading of silane on the pigment.

EXAMPLE 9

Same as Example 2 except the silane was changed to methyltrimethoxysilane effecting a 0.7 wt % loading of silane on the pigment.

EXAMPLE 10

Same as Example 2 except the silane was changed to octyldecyltriethoxysilane effecting a 0.7 wt % loading of silane on the pigment.

HUMIDITY RESISTANCE

Materials from Examples 1–C5 were evaluated for resistance to humidity in a 90% humidity/90 degrees F. environmental chamber with exposure time equal to 7 days. The data is presented below in Table 1. Tint strength (TS) was used as a measure of the optical properties of the pigments. TS, a measure of the ability of a white pigment to provide whiteness and brightness, is determined by reflectance readings of gray tinted vinyl sheets using a spectrophotometer. The higher the reflectance, the higher is the tint strength. Table 1 gives results for the change in TS (delta TS) before and after exposure in the environmental chamber.

TABLE 1

| RESULTS FOR HUMIDITY RESISTANCE | |
| --- | --- |
| Example | Delta TS |
| 1 | 1 |
| 2 | 1 |
| 3 | 4 |
| C-4 | 9 |
| 5 | 1 |
| C-5 | 6 |
| C-6 | 5 |
| 7 | 0 |
| 8 | 1 |
| 9 | 3 |
| 10 | 0 |

As demonstrated in Table 1, a loss of optical properties, measured by change in tinting strength, was readily apparent with no organosilicon treatment.

THROUGHPUT

The treated $TiO_2$ pigments of Example 2 and Comparative Example 4 were tested for throughput rate. It was found that in manufacturing the treated pigment of Example 2, throughput as measured by tonne/hour was increased about versus the untreated TiO$_2$ of Comparative Example 4.

YELLOWING RESISTANCE

To further test the treated TiO$_2$ pigment quality, its properties were tested for yellowing resistance. TiO$_2$ pigments have a tendency to interact with formulation additives, especially phenolic antioxidants used in polyethylene, a problem that gives rise to a yellow discoloration. The yellow discoloration due to antioxidants is noticeable after processing at elevated temperatures and can be further exacerbated by relatively short term exposure to certain wavelengths of light.

Yellowing is expressed as delta b which represents the difference in color reflectivity as measured by a Hunterlab color difference tester, after the pigment is dispersed in a polymer matrix with a hindered amine and an antioxidant. In a 24 hour test, TiO$_2$ was mixed with Tinuvin 770 (a hindered amine light stabilizer, available from Ciba-Geigy) and 2,6-di-t-butyl-4-methylphenol (BHT) dissolved in mineral oil/petrolatum and exposed to ultraviolet (UV) light for 24 hours. The results from this test are provided in Table 2. In a 14 day test, TiO$_2$ was mixed with BHT, Tinuvin 770 and low density polyethylene and exposed to UV light for 14 days. The results from this test are provided in Table 3. The results from Examples 1–5 are provided below in Table 2. The results from Examples 2, 4 and 6–10 are provided below in Table 3.

TABLE 2

YELLOWING RESISTANCE DATA

| Example | Delta b 24 hour exposure |
|---|---|
| 1 | 0.0 |
| 2 | 0.0 |
| 3 | 0.2 |
| C-4 | 2.4 |
| 5 | −0.9 |
| C-5 | 4.9 |

TABLE 3

YELLOWING RESISTANCE DATA

| Example | Delta b 14 day exposure |
|---|---|
| 2 | 2.0 |
| C-4 | 5.4 |
| C-6 | 1.4 |
| 7 | 1.2 |
| 8 | 1.8 |
| 9 | 3.7 |
| 10 | 2.1 |

As demonstrated in Tables 2 and 3, the organosilicon treatment to the coated TiO$_2$ improves photostability.

From the foregoing description, one skilled in the art can easily ascertain the essential characteristics of this invention, and without departing from the spirit and scope thereof, can make various changes and modification of the invention to adapt it to various usages and conditions. Having thus described and exemplified the invention with a certain degree of particularity, it should be appreciated that the following claims are not to be so limited but are to be afforded a scope commensurate with the wording of each element of the claim and equivalents thereof.

What is claimed is:

1. In a composition consisting essentially of a cerium ion-free pigment of rutile TiO$_2$ particles bearing at least one coating which comprises alumina, the pigment having associated therewith 0.05–2%, by weight of the TiO$_2$, of fluoride ions; the improvement comprising, at least one organosilicon compound selected from the group consisting of (a) a silane having the formula:

$$R_xSi(R')_{4-x}$$

wherein

R is a nonhydrolyzable aliphatic alkyl, cycloaliphatic alkyl or aromatic group having at least 1 to about 20 carbon atoms;

R' is a hydrolyzable group selected from an alkoxy, halogen, acetoxy or hydroxy or mixtures thereof; and x=1 to 3; and (b) a mixture of (a) and a polysiloxane having the formula:

$$(R_nSiO_{\frac{4-n}{2}})_m$$

wherein

R is organic or inorganic groups;

n=0–3; and m≧2; and (c) mixtures thereof;

wherein the organosilicon compound is present in an amount of about 0.3 to about 5.0%, by weight based on the coated TiO$_2$ pigment.

2. In a composition consisting essentially of a pigment of rutile TiO$_2$ particles bearing at least one coating which comprises alumina, the pigment having associated therewith 0.05–5%, by weight of the TiO$_2$, of Na$_7$Ce$_6$F$_{31}$ K$_7$Ce$_6$F$_{31}$ Li$_7$Ce$_6$F$_{31}$ or (NH$_4$)$_7$Ce$_6$F$_{31}$;

the improvement comprising, at least one organosilicon compound selected from the group consisting of (a) a silane having the formula:

$$R_xSi(R')_{4-x}$$

wherein

R is a nonhydrolyzabale aliphatic alkyl, cycloaliphatic alkyl or aromatic group having at least 1 to about 20 carbon atoms;

R' is a hydrolyzable group selected from an alkoxy, halogen, acetoxy or hydroxy or mixtures thereof; and x=1 to 3; and (b) a mixture of (a) and a polysiloxane having the formula:

$$(R_nSiO_{\frac{4-n}{2}})_m$$

wherein

R is organic or inorganic groups;

n=0–3; and m≧2; and (c) mixtures thereof;

wherein the organosilicon compound is present in an amount of about 0.3 to about 5.0%, by weight based on the coated TiO$_2$ pigment.

3. A polyolefin matrix comprising polyolefin and a pigment according to claim 1 or claim 2.

4. The composition of claim 1 or claim 2 wherein the organosilicon compound has the formula:

$$R_xSi(R')_{4-x}$$

wherein

R is a nonhydrolyzable aliphatic, cycloaliphatic alkyl or aromatic group having at least 1 to about 20 carbon atoms;

R' is a hydrolyzable group selected from an alkoxy, halogen, acetoxy or hydroxy or mixtures thereof; and x=1 to 3.

5. The composition of claim 4 wherein the organosilicon compound further comprises a polysiloxane having the formula:

$$(R_nSiO_{\frac{4-n}{2}})_m$$

wherein

R is organic or inorganic groups;

n=0–3; and m≧2.

6. The composition of claim 5 wherein the polysiloxane is polydimethylsiloxane.

7. The composition of claim 4 wherein the organosilicon compound is present in an amount of about 0.3 to about 2.0% by weight based on the coated TiO$_2$ pigment and the organosilicon compound is octyltriethoxysilane.

8. In a process for preparing a TiO$_2$ pigment having a coating comprising alumina having associated therewith fluoride ions, the improvement comprising, adding at least one organosilicon compound to improve the optical properties of said coated TiO$_2$ pigment, said organosilicon compound being selected from the group consisting of (a) a silane having the formula:

$$R_xSi(R')_{4-x}$$

wherein

R is a nonhydrolyzable aliphatic alkyl, cycloaliphatic alkyl or aromatic group having at least 1 to about 20 carbon atoms;

R' is a hydrolyzable group selected from an alkoxy, halogen, acetoxy or hydroxy or mixtures thereof; and x=1 to 3

(b) a mixture of (a) and a polysiloxane having the formula:

$$(R_nSiO_{\frac{4-n}{2}})_m$$

wherein

R is organic or inorganic group;

n=0–3; and m≧2; and (c) mixtures thereof.

9. The process of claim 8 wherein the organosilicon compound is present in the amount of about 0.3 to about 5.0% by weight based on the weight of the coated pigment and the organosilicon compound has the formula:

$$R_xSi(R')_{4-x}$$

wherein

R is a nonhydrolyzable aliphatic, cycloaliphatic or aromatic group having at least 1 to about 20 carbon atoms;

R' is a hydrolyzable group selected from an alkoxy, halogen, acetoxy or hydroxy or mixtures thereof; and x=1 to 3.

10. The process of claim 9, further comprising a polysiloxane having the formula:

$$(R_nSiO_{\frac{4-n}{2}})_m$$

wherein

R is organic or inorganic groups;

n=0–3; and m≧2.

11. The process of claim 8 or claim 9 or claim 10 wherein the fluoride ions are replaced with phosphate ions by adding phosphoric acid.

12. The process of claim 9 wherein the organosilicon compound is present in the amount of about 0.3 to about 2.0%, by weight based on the weight of the coated pigment and the organosilicon compound is octyltriethoxysilane.

13. The composition of claim 1 or claim 2 wherein fluoride ions are replaced with 0.05–2% phosphate ions.

* * * * *